US011592259B1

(12) United States Patent
Davis et al.

(10) Patent No.: US 11,592,259 B1
(45) Date of Patent: Feb. 28, 2023

(54) ILLUMINATED FEEDNECK

(71) Applicant: Gel Blaster LLC, Austin, TX (US)

(72) Inventors: Eric Alan Davis, Austin, TX (US);
Robert Kovacs, Budapest (HU); Colin Guinn, Austin, TX (US)

(73) Assignee: Gel Blaster LLC, Austin, TX (US)

(*) Notice: Subject to any disclaimer, the term of this patent is extended or adjusted under 35 U.S.C. 154(b) by 0 days.

(21) Appl. No.: 17/728,016

(22) Filed: Apr. 25, 2022

Related U.S. Application Data

(60) Provisional application No. 63/298,600, filed on Jan. 11, 2022.

(51) Int. Cl.
| | | |
|---|---|---|
| F41B 7/08 | (2006.01) | |
| F41B 11/52 | (2013.01) | |
| F42B 12/38 | (2006.01) | |
| H02J 50/30 | (2016.01) | |
| F42B 12/42 | (2006.01) | |

(52) U.S. Cl.
CPC ............ *F41B 7/08* (2013.01); *F42B 12/38* (2013.01); *F42B 12/42* (2013.01); *H02J 50/30* (2016.02); *A63B 2225/76* (2020.08)

(58) Field of Classification Search
CPC .......... F42B 12/38; F42B 12/40; F42B 12/42; F41B 11/50; F41B 11/52; F41B 11/57; F41B 11/89; F41B 7/08; A63B 2225/74; A63B 2225/76; Y10S 273/24
USPC ...... 42/54; 124/1, 47, 80, 41.1, 49; 473/570; 446/219, 473
See application file for complete search history.

(56) References Cited

U.S. PATENT DOCUMENTS

| | | | | |
|---|---|---|---|---|
| 2,568,279 A * | 9/1951 | Walkup | ..................... | F41J 9/165 273/362 |
| 3,240,924 A * | 3/1966 | Darby | ................. | F21V 33/0064 362/112 |
| 5,415,151 A * | 5/1995 | Fusi | ........................ | F42B 12/38 124/16 |
| 5,730,321 A * | 3/1998 | McAllister | ............ | F41B 9/0078 222/394 |
| 5,762,058 A * | 6/1998 | Cheng | ..................... | F41A 21/32 124/83 |
| 5,876,995 A * | 3/1999 | Bryan | ...................... | A24D 3/14 435/189 |
| 6,048,280 A * | 4/2000 | Palmer | .................... | F41B 11/71 124/16 |
| 6,247,995 B1 * | 6/2001 | Bryan | ................... | B05B 7/2472 435/189 |
| 6,298,841 B1 * | 10/2001 | Cheng | ..................... | F41A 21/32 102/501 |
| 6,591,824 B2 * | 7/2003 | Hatcher | .................. | F41B 11/52 124/56 |

(Continued)

*Primary Examiner* — Alexander R Niconovich

(57) ABSTRACT

An illuminated feedneck may be utilized in a toy blaster, laser tag gun, airsoft or other toy gun, and the like to illuminate ammunition, such as Gellets, for use in non-daylight hours or indoors. A feedneck may be illuminated through ultraviolet light that may be powered through batteries and/or one or more other forms of power. The illuminated feedneck may charge ammunition through a series of specialty UVA (~400 nM) wavelength light emitting diodes (LEDs) that safely become illuminated with a long-lasting and bright green glow. The ammunition may be infused to create a glow-in-the dark tracer effect as they are powered and pass through the illuminated feedneck.

17 Claims, 3 Drawing Sheets

(56) References Cited

U.S. PATENT DOCUMENTS

| | | | | |
|---|---|---|---|---|
| 6,648,726 | B2* | 11/2003 | Hornsby | F42B 6/10 |
| | | | | 446/175 |
| 7,004,813 | B2* | 2/2006 | Zuloff | F42B 12/38 |
| | | | | 446/175 |
| 7,040,308 | B2* | 5/2006 | Ciesiun | F41B 11/52 |
| | | | | 124/47 |
| 7,870,851 | B2* | 1/2011 | Mahany | F41B 11/68 |
| | | | | 124/56 |
| 7,900,619 | B1* | 3/2011 | Palmer | F42B 12/42 |
| | | | | 124/16 |
| 7,921,838 | B2* | 4/2011 | Tippmann, Jr. | F41B 11/62 |
| | | | | 124/75 |
| 8,371,282 | B2* | 2/2013 | Meggs | F41B 11/641 |
| | | | | 124/56 |
| 8,434,765 | B1* | 5/2013 | Taylor | F41J 9/165 |
| | | | | 273/362 |
| 8,590,519 | B2* | 11/2013 | Barish | F41B 11/52 |
| | | | | 124/69 |
| 8,596,255 | B2* | 12/2013 | Meggs | F42B 6/10 |
| | | | | 124/56 |
| 9,067,127 | B2* | 6/2015 | Clark | F41A 33/02 |
| 10,488,146 | B2* | 11/2019 | Quek | A63H 33/22 |
| 10,898,763 | B2* | 1/2021 | Osborn | F21K 2/06 |
| 2003/0213481 | A1* | 11/2003 | Bell | F41B 11/52 |
| | | | | 124/56 |
| 2012/0152221 | A1* | 6/2012 | Meggs | F41A 9/83 |
| | | | | 206/204 |
| 2013/0152912 | A1* | 6/2013 | Spencer | F41B 11/50 |
| | | | | 124/82 |

* cited by examiner

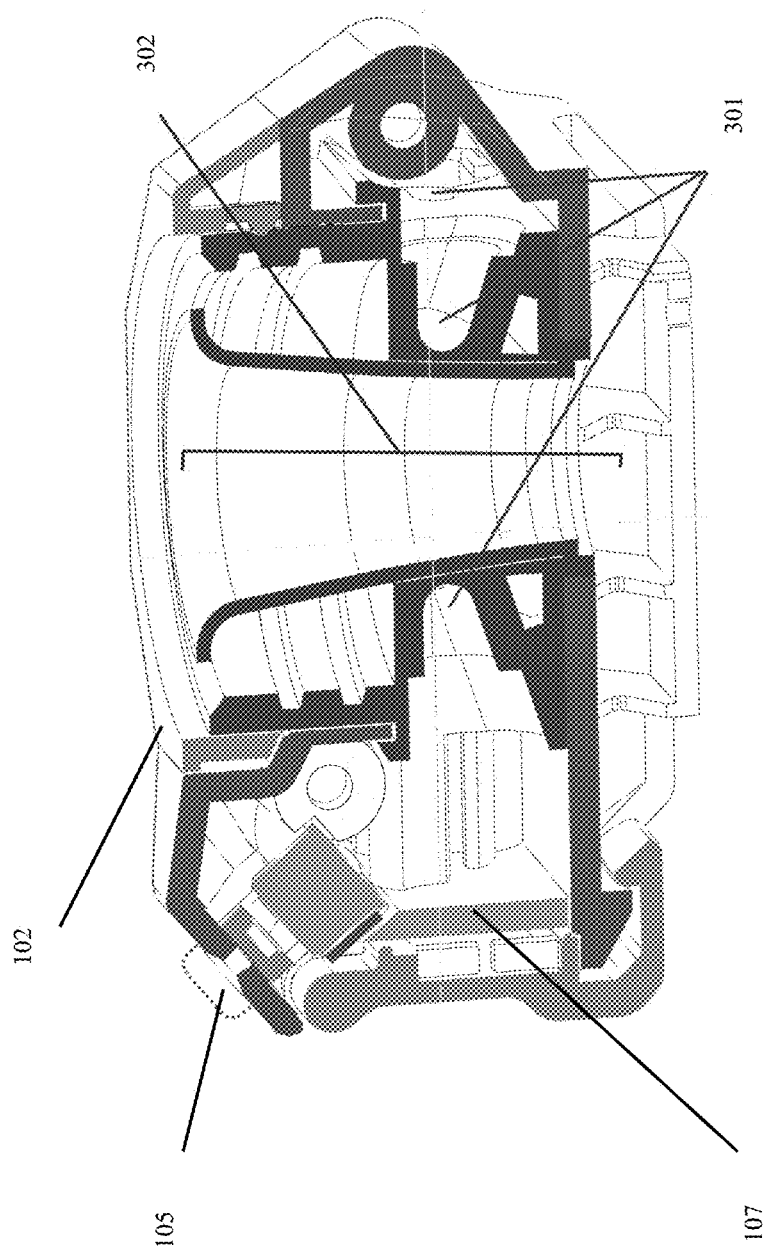

ILLUMINATED FEEDNECK

CROSS-REFERENCE TO RELATED APPLICATION

The present application is a non-provisional of, and claims priority to, U.S. Patent Application No. 63/298,600 filed Jan. 11, 2022, the disclosure of which is incorporated by reference in its entirety.

FIELD OF THE DISCLOSURE

The present disclosure generally relates to feednecks, and more particularly to illuminated feednecks for use in toy blasters, laser tag guns, airsoft or other toy guns, and the like.

BACKGROUND

Toy blasters and other recreational items such as laser tag guns may be utilized outside in non-daylight hours or indoors, such as in a laser tag arena. To provide for ammunition that may be utilized in darker situations, existing products may utilize complicated high-voltage circuits to power and light up the ammunition that can be quite costly. This makes charged ammunition an expensive and less accessible item for many consumers.

SUMMARY

Embodiments of the present disclosure may provide an illuminated feedneck that may be utilized in a toy blaster, laser tag gun, airsoft or other toy gun, and the like to illuminate ammunition, such as Gellets, for use in non-daylight hours or indoors. A feedneck may be illuminated through ultraviolet light that may be powered through batteries and/or one or more other forms of power in embodiments of the present disclosure. The illuminated feedneck according to embodiments of the present disclosure may charge ammunition through a series of specialty UVA (~400 nM) wavelength light emitting diodes (LEDs) that safely become illuminated with a long-lasting and bright green glow. The ammunition may be infused to create a glow-in-the dark tracer effect as they are powered and pass through the illuminated feedneck.

BRIEF DESCRIPTION OF THE DRAWINGS

For a more complete understanding of this disclosure, reference is now made to the following description, taken in conjunction with the accompanying drawings, in which:

FIG. 3 depicts an interior view of an illuminated feedneck according to an embodiment of the present disclosure.

DETAILED DESCRIPTION

Embodiments of the present disclosure may provide an illuminated feedneck that may be utilized in a toy blaster, laser tag gun, airsoft or other toy gun, and the like to illuminate ammunition, such as Gellets, for use in non-daylight hours or even indoors. A feedneck according to embodiments of the present disclosure may be illuminated through ultraviolet light that may be powered through batteries and/or one or more other forms of power including, but not limited to, power via the front rails, power from the toy blaster/gun itself (as the toy blaster/gun may include a battery which may be rechargeable and/or may include fast charging through USB-C), and/or solar power. In an embodiment of the present disclosure, two or more AAA batteries may be used to power the illuminated feedneck; however, more or fewer or different types of batteries may be used without departing from the present disclosure.

The illuminated feedneck according to embodiments of the present disclosure may charge Gellets through a series of specialty UVA (~400 nM) wavelength light emitting diodes (LEDs) that safely become illuminated with a long-lasting and bright green glow. While illumination is described as having a bright green glow, it should be appreciated that the Gellets may be illuminated with one or more other colors without departing from the present disclosure. The Gellets may be infused to create a glow-in-the dark tracer effect as they are powered and pass through the illuminated feedneck. It should be appreciated that Gellets are colorful absorbent beads that may burst on contact and begin to disintegrate. They are non-toxic and eco-friendly. While Gellets are described as ammunition that may be powered and illuminated through an illuminated feedneck according to embodiments of the present disclosure, it should be appreciated that the illuminated feedneck may power and illuminate other types of ammunition without departing from the present disclosure.

It should be appreciated the illuminated feedneck may be interchangeable with one or more types of toy blasters or guns in embodiments of the present disclosure. Accordingly, the illuminated feedneck may be offered as an accessory to be utilized with one or more toy blasters or guns. However, there may be other embodiments of the present disclosure where the illuminated feedneck may be integral with the toy blaster or gun without departing from the present disclosure.

Figure 1:
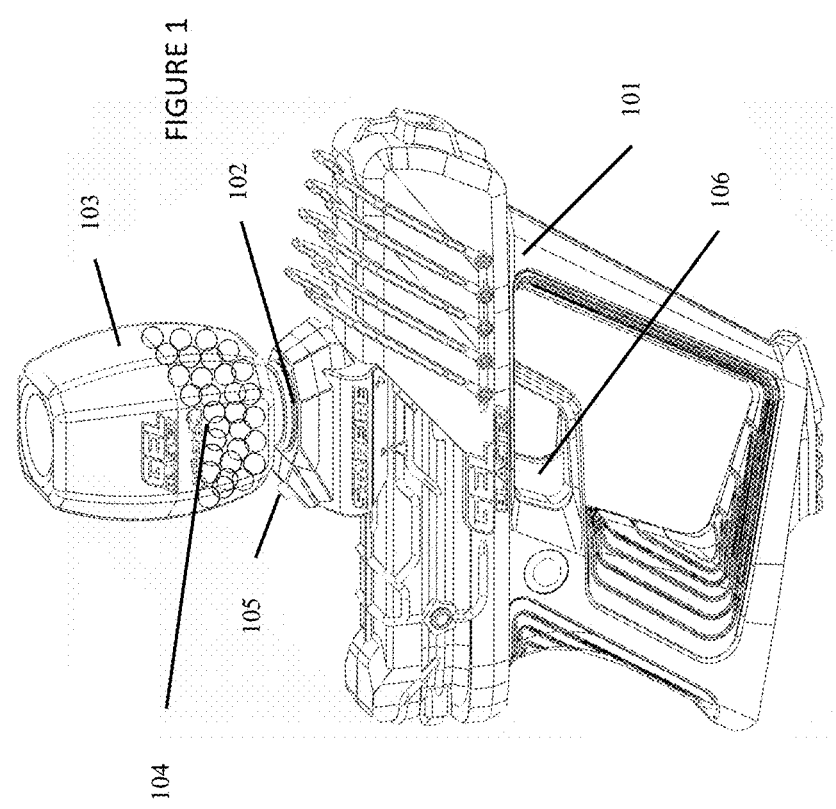
FIG. 1 depicts a toy blaster incorporating an illuminated feedneck according to an embodiment of the present disclosure.
Figure 4:
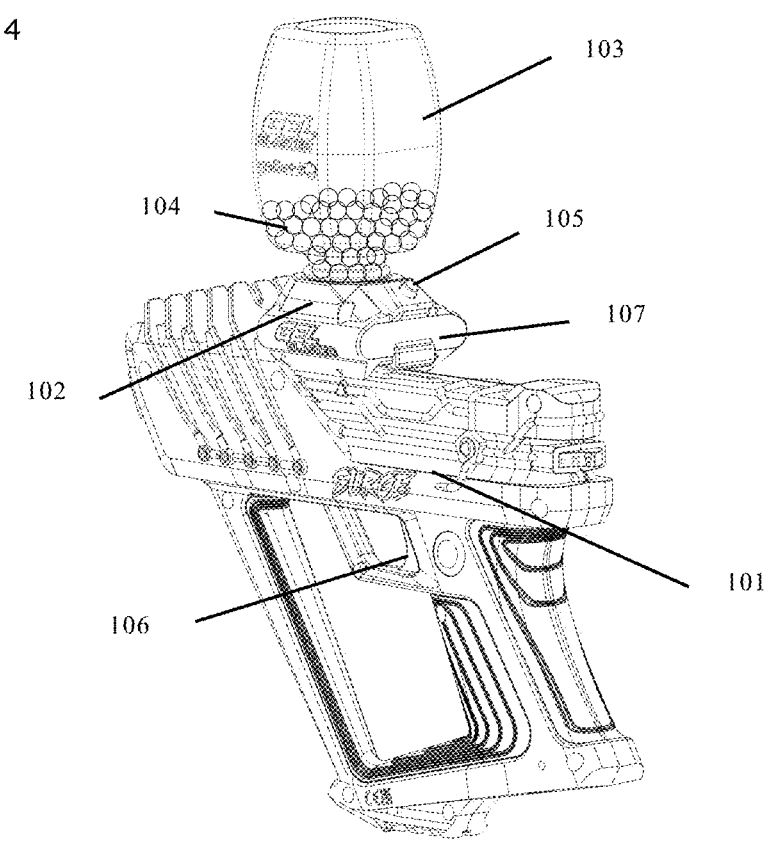
FIG. 4 depicts another view of a blaster incorporating an illuminated feedneck according to an embodiment of the present disclosure.

FIG. 1 depicts toy blaster 101 incorporating illuminated feedneck 102 according to an embodiment of the present disclosure. In this embodiment, illuminated feedneck 102 may be attached and detached from toy blaster 101. Similarly, hopper 103 (see also FIG. 4) to hold ammunition 104 (see also FIG. 4), such as Gellets, may be attached to a top portion of illuminated feedneck 102 as provided in FIG. 1. Power switch 105 (see also FIG. 4) may be provided to power blasted 101, and trigger 106 (see also FIG. 4) may be provided to activate blaster 101.

Figure 2:
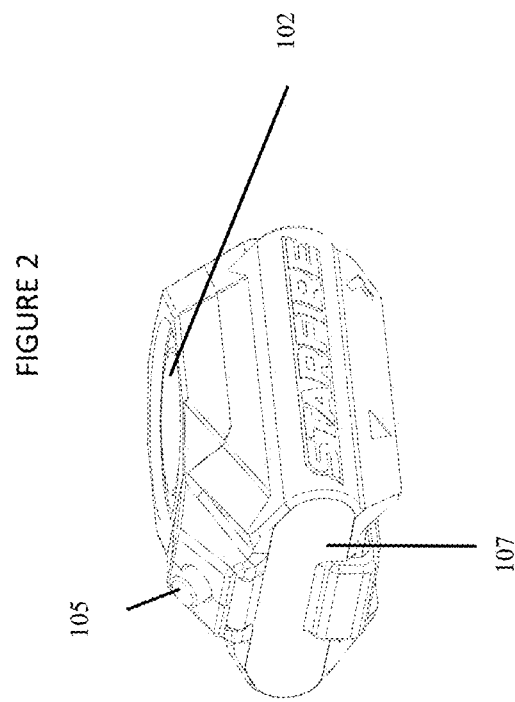
FIG. 2 depicts an illuminated feedneck according to an embodiment of the present disclosure.

FIG. 2 depicts illuminated feedneck 102 according to an embodiment of the present disclosure. As depicted herein, illuminated feedneck 102 may be constructed through six injection-molded body components including a left-side exterior shell, a right-side exterior shell, a rear battery hatch, power switch button 105, inner charging chamber 302 (FIG. 3), and a form-fit snap compression ring. While six components are described herein, it should be appreciated that more or fewer components may be utilized to construct an illuminated feedneck without departing from the present disclosure. It also should be appreciated that the inner charging chamber may be transparent in some embodiments of the present disclosure. In an embodiment of the present disclosure, two screws may be utilized to hold the left-side exterior shell and right-side exterior shell together; however, other fastening mechanisms may be utilized without departing from the present disclosure.

The power switch button 105 (FIG. 2) may provide a latching two-position power switch that may connect to a plurality of 3.2v~1W UVA (~400-405 nM) light emitting diodes (LEDs) 301 (FIG. 3) that may be connected in parallel to 2 AAA cell batteries, such as in the battery compartment 107 (FIG. 2). In an embodiment of the present disclosure, four LEDs may be provided; however, more or fewer LEDs may be utilized without departing from the present disclosure. Further, while 2 AAA cell batteries may be utilized to power the LEDs, it should be appreciated that more or fewer or different types of batteries may be utilized without departing from the present disclosure. Similarly, other types of power may be utilized in some embodiments of the present disclosure. However, if 2 AAA cell batteries are utilized, this may amount to approximately 50 hours of runtime before the batteries may need to be replaced and/or recharged in an embodiment of the present disclosure. The battery terminals, if utilized, may be attached to an inside internal wall of the module as well as to the latch door. Fastener screws or other similar fastening mechanisms may be utilized to close the compartments where the LEDs and/or batteries are housed; however, in some embodiments of the present disclosure, other sealing mechanisms, such as hot glue application, may be utilized to promote water ingress protection for the LEDs and/or batteries.

An illuminated feedneck according to embodiments of the present disclosure may allow for easier use of toy blasters or other recreational items including, but not limited to, laser tag guns, airsoft or other toy guns, and the like outdoors at night or indoors in darker settings. In addition, the illuminated feedneck may provide a more affordable means for consumers to have illuminated ammunition. Moreover, the illuminated feedneck may offer long battery life, while maintaining clog-free operation that may uniformly charge phosphorescent glow-in-the-dark ammunition, such as Gellets. In addition, the illuminated feedneck may be waterproof or water-resistant in some embodiments of the present disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. An illuminated feedneck for use with a blaster comprising:
   one or more UVA light emitting diodes (LEDs) connected to a power source; and
   an inner charging chamber surrounded by the one or more UVA LEDs positioned within the inner charging chamber,
   a portion that receives a hopper that holds a plurality of absorbent ammunition,
   wherein the one or more UVA LEDs in the inner charging chamber transmit light upward into the hopper to illuminate the plurality of absorbent ammunition in the hopper before they move into the inner charging chamber and the one or more UVA LEDs transmit light in the inner charging chamber to further charge the plurality of absorbent ammunition as the plurality of absorbent ammunition enter the blaster from the inner charging chamber, and
   wherein the one or more UVA LEDs are powered by the power source.

2. The illuminated feedneck of claim 1, wherein the inner charging chamber is transparent.

3. The illuminated feedneck of claim 1, wherein there are four UVA LEDs operating in an approximately 315-400 wavelength range.

4. The illuminated feedneck of claim 1, wherein the illuminated feedneck is water-resistant.

5. The illuminated feedneck of claim 1, wherein the illuminated feedneck is detachable from the blaster.

6. The illuminated feedneck of claim 1, wherein the illuminated feedneck is integrally formed with the blaster.

7. An illuminated feedneck for use with a blaster comprising:
   one or more UVA light emitting diodes (LEDs) operating in an approximately 315-400 wavelength range, the one or more UVA LEDs connected to at least one form of power; and
   an inner charging chamber surrounded by the one or more UVA LEDs positioned within the inner charging chamber; and
   a portion that receives a hopper that holds a plurality of absorbent ammunition being powered and illuminated,
   wherein the plurality of absorbent ammunition are illuminated by the one or more UVA LEDs in the inner charging chamber that are powered by the at least one form of power wherein the one or more UVA LEDs transmit light upward into the hopper to illuminate the plurality of absorbent ammunition in the hopper before they move into the inner charging chamber and the one or more UVA LEDs transmit light in the inner charging chamber to further charge the plurality of absorbent ammunition as the plurality of absorbent ammunition enter the blaster from the inner charging chamber.

8. The illuminated feedneck of claim 7, wherein the at least one form of power is one or more batteries.

9. The illuminated feedneck of claim 7, wherein the at least one form of power is supplied from the blaster.

10. The illuminated feedneck of claim 7, wherein the at least one form of power is solar power.

11. The illuminated feedneck of claim 7, wherein the illuminated feedneck is detachable from the blaster.

12. The illuminated feedneck of claim 7, wherein the illuminated feedneck is integrally formed with the blaster.

13. The illuminated feedneck of claim 7, wherein the one or more UVA LEDs operate at an approximately 400 nm wavelength.

14. An illuminated feedneck for use with a blaster comprising:
   a portion that receives a hopper that holds a plurality of absorbent ammunition being powered and illuminated, wherein illumination of the plurality of absorbent ammunition begins in the hopper;
   one or more UVA light emitting diodes (LEDs) connected to at least one form of power, wherein the plurality of absorbent ammunition are illuminated by the one or more UVA LEDs powered by the at least one form of power; and an inner charging chamber that receives the plurality of absorbent ammunition to be powered and illuminated from the hopper the one or more UVA LEDs positioned within and surrounding the inner charging chamber, wherein the one or more UVA LEDs in the inner charging chamber transmit light upward into the hopper to illuminate the plurality of absorbent ammunition in the hopper before they move into the inner charging chamber and the one or more UVA LEDs transmit light in the inner charging chamber to further charge the plurality of absorbent ammunition as the plurality of absorbent ammunition enter the blaster from the inner charging chamber.

15. The illuminated feedneck of claim 14, wherein the at least one form of power is selected from the group comprising:

one or more batteries, power supplied from the blaster, and/or solar power.

16. The illuminated feedneck of claim 14, wherein the illuminated feedneck is detachable from the blaster.

17. The illuminated feedneck of claim 14, wherein the illuminated feedneck is integrally formed with the blaster.

\* \* \* \* \*